(12) United States Patent
Belvin et al.

(10) Patent No.: US 9,815,263 B2
(45) Date of Patent: Nov. 14, 2017

(54) METHOD FOR MANUFACTURING A THIN FILM STRUCTURAL SYSTEM

(75) Inventors: Wendell Keith Belvin, Wicomico, VA (US); David W. Sleight, Virginia Beach, VA (US); John W. Connell, Yorktown, VA (US); Thomas J. Burns, Williamsburg, VA (US); Nancy M. H. Holloway, White Marsh, VA (US); Frank L. Palmieri, Hampton, VA (US); Gary A. Wainwright, Lanexa, VA (US); Robert C. Andrews, Gloucester, VA (US); Martin Eckhard Zander, Saxony-Anhalt (DE)

(73) Assignee: THE UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 1061 days.

(21) Appl. No.: 13/273,516

(22) Filed: Oct. 14, 2011

(65) Prior Publication Data

US 2012/0177892 A1    Jul. 12, 2012

Related U.S. Application Data

(60) Provisional application No. 61/431,245, filed on Jan. 10, 2011.

(51) Int. Cl.
*B29C 70/74* (2006.01)
*B32B 37/14* (2006.01)
(Continued)

(52) U.S. Cl.
CPC .......... *B32B 37/142* (2013.01); *B29C 70/747* (2013.01); *B32B 5/18* (2013.01);
(Continued)

(58) Field of Classification Search
CPC .......... B32B 2307/10; B32B 2307/302; B32B 2307/40; B32B 2310/0806; B32B 37/142; B05D 2420/01; B29C 70/00–70/20
(Continued)

(56) References Cited

U.S. PATENT DOCUMENTS

| 4,313,254 A | 2/1982 | Feldman et al. |
| 4,354,484 A | 10/1982 | Malone et al. |

(Continued)

OTHER PUBLICATIONS

NeXolve. "CP1 Polyimide", found at http://nexolvematerials.com/low-cure-polyimides/cp1-polyimide (2001).*
(Continued)

*Primary Examiner* — Dah-Wei D Yuan
*Assistant Examiner* — Jose Hernandez-Diaz
(74) *Attorney, Agent, or Firm* — Andrea Z. Warmbier; Robin W. Edwards; Mark P. Dvorscak

(57) ABSTRACT

A method for manufacturing a thin film structural system including a thin film structure includes depositing a reinforcing material in a liquid form in a predefined pattern on a thin film membrane, and transforming the reinforcing material in the predefined pattern to form a reinforcing element connected to the thin film membrane. The reinforcing material may be deposited in a melted form and solidified by cooling, may be transformed by a light or laser induced chemical reaction, or may be deposited and solidified such that the reinforcing element is at least partially embedded in the thin film membrane. The predefined pattern may redistribute loads around a damaged portion of the thin film structure, or define a hinge, a folding line, a stiffening feature. The reinforcing element may be electrically, optically or thermally conductive, to communicate with a device included in the system. The system may be a space structure.

13 Claims, 3 Drawing Sheets

(51) Int. Cl.
*B32B 5/18* (2006.01)
*B32B 27/28* (2006.01)

(52) U.S. Cl.
CPC ........ *B32B 27/281* (2013.01); *B32B 2307/10* (2013.01); *B32B 2307/302* (2013.01); *B32B 2307/40* (2013.01); *B32B 2310/0806* (2013.01); *Y10T 156/10* (2015.01); *Y10T 428/24802* (2015.01); *Y10T 428/31504* (2015.04); *Y10T 428/31721* (2015.04)

(58) Field of Classification Search
USPC .................................. 427/162, 256, 553, 58
See application file for complete search history.

(56) References Cited

U.S. PATENT DOCUMENTS

| | | | |
|---|---|---|---|
| 4,368,726 | A | 1/1983 | Ellsworth |
| 4,514,583 | A | 4/1985 | Izu et al. |
| 4,625,070 | A | 11/1986 | Berman et al. |
| 5,468,542 | A * | 11/1995 | Crouch .................... 428/215 |
| 6,959,520 | B2 | 11/2005 | Hartman |
| 6,994,082 | B2 | 2/2006 | Hochberg et al. |
| 7,019,207 | B2 | 3/2006 | Harneit et al. |
| 7,288,617 | B2 | 10/2007 | Treacher et al. |
| 2002/0112435 | A1 | 8/2002 | Hartman |
| 2003/0121542 | A1 | 7/2003 | Harneit et al. |
| 2003/0164186 | A1* | 9/2003 | Clark et al. .................. 136/245 |
| 2004/0055594 | A1 | 3/2004 | Hochberg et al. |
| 2004/0123550 | A1 | 7/2004 | Hartman |
| 2004/0135131 | A1 | 7/2004 | Treacher et al. |
| 2005/0104258 | A1* | 5/2005 | Lennhoff .................... 264/465 |
| 2006/0001726 | A1* | 1/2006 | Kodas et al. ................ 347/105 |
| 2008/0000521 | A1 | 1/2008 | Sivoththaman et al. |
| 2008/0271675 | A1 | 11/2008 | Choi et al. |
| 2011/0005585 | A1 | 1/2011 | Hsieh et al. |
| 2011/0088686 | A1 | 4/2011 | Hochberg et al. |
| 2011/0186117 | A1 | 8/2011 | Kumar et al. |
| 2011/0189817 | A1 | 8/2011 | Takahashi et al. |
| 2011/0192450 | A1 | 8/2011 | Liu et al. |
| 2011/0281070 | A1* | 11/2011 | Mittal ............ H01L 31/022466 428/142 |

OTHER PUBLICATIONS

Cicha, L.Z., "Evaluation of 3D structures fabricated with two-photon-photopolymerization by using FTIR spectroscopy," Journal of Applied Physics, 110 (2011), 064911, pp. 1-5.

Woo, K., et al., "Tearing of Thin Sheets with Wrinkling," AIAA 2011-2089, 52nd AIAA/ASME/ASCE/ASC Structures, Structural Dynamics and Materials Conference, Apr. 4-7, 2011, Denver, Colorado.

Salama, M. et al., "Intelligent Gossamer Structures: A Review of Recent Developments and Future Trends," AIAA, AIAA-2001-1196, 2001.

Zignego, D. L., et al., "Essential Work of Fracture for Damage Modeling of Polymer Membranes," AIAA 2011-2085, 52nd AIAA/ASME/ASCE/ASC Structures, Structural Dynamics and Materials Conference, Apr. 4-7, 2011, Denver Colorado.

Combes, S.A. et al., "Fexural Stiffness in Insect Wings II. Spatial Distribution and Dynamic Wing Bending," The Journal of Experimental Biology 2006, 2003, pp. 2989-2997.

Zignego, D. L., "Investigation of Membrane Tearing Characterization and Healing," Master of Science Thesis, Montana State University, Bozeman, Montana, 2010.

Cortet, P. P., et al., "Slow crack growth in polycarbonate films," Europhysics Letters, vol. 71, 2005, pp. 242-248.

Jeong, S.W. et al, Photosensitive barrier rib paste for plasma display panel and photolithographic process, Journal of Applied Polymer Science, vol. 85, Issue 10, Sep. 6, 2002, pp. 1-3.

* cited by examiner

METHOD FOR MANUFACTURING A THIN FILM STRUCTURAL SYSTEM

CROSS-REFERENCE TO RELATED APPLICATIONS

This application claims the benefit of and priority to U.S. Provisional Patent Application No. 61/431,245, filed Jan. 10, 2011, which is hereby incorporated by reference in its entirety.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefor.

TECHNICAL FIELD

This disclosure relates to manufacturing of a thin film structure and a low mass, large-scale thin film structural system including a thin film structure.

BACKGROUND OF THE INVENTION

Lightweight, damage-tolerant, flexible and deployable thin film structures are enabling for a variety of space exploration missions when configured, for example, as solar sails, solar arrays, sunshields, radar and reflect arrays, solar concentrators, and space solar power collectors. Spanning large areas with thin film materials, e.g., membrane structures, to separate environments or to collect and/or reflect spatially disperse particles such as chemicals or electromagnetic radiation can result in progressive failure due to tearing or ripping of the membrane. Methods for increasing thin film durability have involved either increasing the fracture toughness of the materials, increasing the material thickness to carry more load before failure, or adding "rip stop" to the film in strategic areas. Increasing the material thickness introduces a weight penalty and increases packaging space, both disadvantages for a space application. Adding "rip stop" to the membrane typically requires bonding a reinforcing material to the membrane using an adhesive, using human touch labor and wet and/or dry bonding, which can be very expensive and often damaging to the substrate.

SUMMARY OF THE INVENTION

A method for manufacturing a thin film structural system including a thin film structure is provided. The method includes depositing a reinforcing material in a liquid form in a predefined pattern on a thin film membrane, and transforming the reinforcing material in the predefined pattern to form a reinforcing element connected to the thin film membrane. The thin film membrane and the reinforcing element form a thin film structure. In a non-limiting example, the reinforcing material may be deposited in a melted form and solidified by cooling. In another non-limiting example, the reinforcing material may be transformed by a light or laser induced chemical reaction. In another non-limiting example, the reinforcing material may be deposited and solidified such that the reinforcing element is at least partially embedded in the thin film membrane.

In one example, the predefined pattern may be configured to redistribute loads around a damaged portion of the membrane and/or the thin film structure. In another example, the predefined pattern may be configured to define a hinge, a folding line, a stiffening feature, or a combination of these. The thin film structural system may be formed by incorporating and/or joining a plurality of thin film structures in the system, where each of the respective thin film structures may include a respective thin film membrane and a respective reinforcing element. The predefined pattern of the respective reinforcing element of at least one of the plurality of thin film structures may be different from the predefined pattern of the respective reinforcing element of at least another of the plurality of thin film structures.

The method may further include providing a device in operative communication with the reinforcing element. The device may be configured as one of an electrical device, an optical device, an electro-optic device, and a thermal device. The reinforcing element may be configured to transmit a signal to or from the device, and/or may be configured to be at least one of electrically conductive, optically conductive, and thermally conductive.

The thin film structural system may be configured as a space structure, which may be an expandable space structure. The space structure may include one or more thin film structures where the predefined pattern of one or more of the reinforcing elements provides a local stiffening feature and/or a hinge, a hinge line and/or a folding line to facilitate packaging and deployment of the expandable space structure. The predefined pattern may be configured to redistribute loads around a damaged portion of the membrane and/or the thin film structure, to prevent progressive damage.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION OF THE INVENTION

Figure 1:
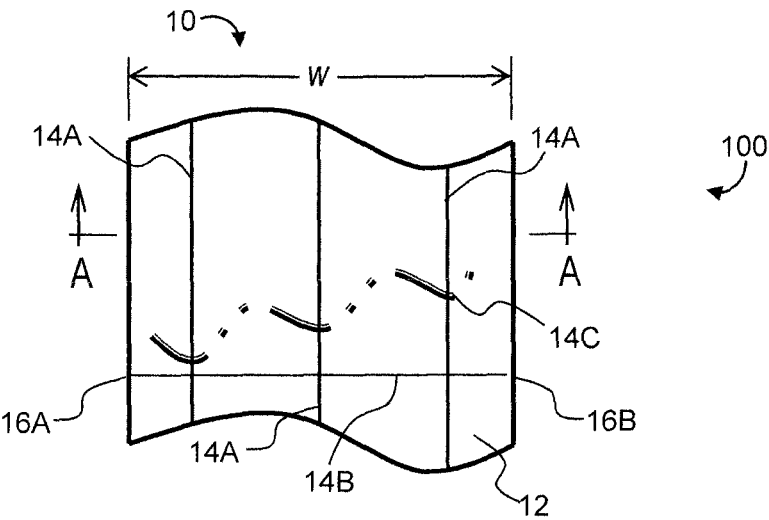
FIG. 1 is a schematic top view of a thin film structure comprising a reinforcing material deposited on a thin film membrane.

Referring to the drawings wherein like reference numbers represent like components throughout the several figures, the elements shown in FIGS. 1-7 are not necessarily to scale or proportion. Accordingly, the particular dimensions and applications provided in the drawings presented herein are not to be considered limiting. A method of manufacturing a low mass, large-scale hierarchical thin film structural system is provided herein. FIG. 1 shows an example of a thin film structure 10 which may be incorporated in a structural system 100. In one embodiment, the structural system 100 may be a space structure, wherein a thin film structure such as the structure 10 may provide a lightweight, damage tolerant, flexible and deployable structure. As used herein, the term "thin" can refer to a structure having a thickness of about 0.5 microns to 250 microns. The structural system 100 may be, for example, an expandable system, and/or may be a system used for space exploration, such as a solar sail, a solar array, a sunshield, a radar, and reflect array, a solar concentrator and/or a space solar power collector. By taking a hierarchical design approach to configure the structure 10, the performance of the system 100 may be enhanced and a high degree of multi-functionality may be incorporated into the system 100.

As used herein, the term "hierarchical" may refer to a thin film structure 10 or structural system 100 which may include various levels of structural hierarchy provided by, for example, one or more reinforcing elements, such as the elements 14A-14G shown in FIGS. 1-6, which may be arranged in predefined patterns and/or in a combination of patterns and operatively connected to a membrane, such as the membrane 12 shown in FIGS. 1-7, to facilitate packaging and folding of the structural system 100, and/or to provide damage tolerance, structural support, flexibility, self-deployment, sensing, and/or conductive capabilities to the structure 10 or system 100. The membrane 12 may be, for example, composed of a thin film. The membrane 12 may also be referred to as a substrate or as a thin film. An additive manufacturing process, which may also be referred to herein as a print manufacturing or digital manufacturing process, may be used to deposit and operatively attach the reinforcing material 24 forming the reinforcing element 14 in a predetermined pattern to the membrane 12.

Additionally, as used herein, the term "hierarchical" may refer to various functions performed by the membrane 12 and the reinforcing elements 14 individually and/or in combination. For example, the reinforcing elements 14 may comprise materials which may be one or more of thermally, optically and electrically conductive or actuable, or may incorporate materials or features contributing to the physical properties of the reinforcing element and/or structure 10 such as flexibility, strength, stability, etc.

Figure 5:
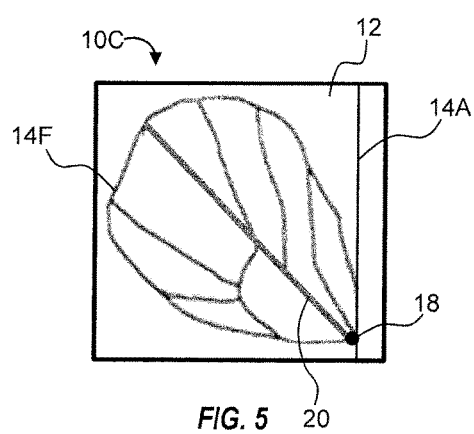
FIG. 5 is a schematic plan view of a thin film structure with the reinforcing material in a third illustrative example of a reinforcing pattern.
Figure 6:
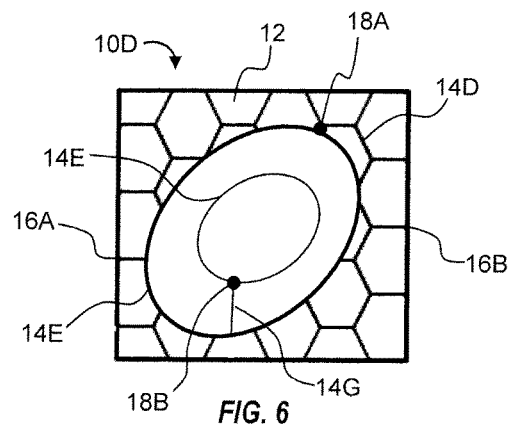
FIG. 6 is a schematic plan view of a thin film structure with the reinforcing material in a fourth illustrative example of a reinforcing pattern.

The hierarchy of the structure 10 and/or system 100 may include one or more devices such as the device 18 as shown in FIGS. 5 and 6, to provide additional functionality to the structure 10 and/or system 100. A plurality of devices 18 may be spatially located on the membrane 12 and each device 18 may be in communication with at least another device 18, a portion of the reinforcing elements 14, and/or a controller (not shown). The device 18 which may be configured, for example, as a sensor or actuator in operative communication with one or more of a reinforcing element 14, a controller, etc. to enable the structure 10 including at least one reinforcing element 14 and the membrane 12 to operate as a sensing, signaling, or conductive device, or be otherwise electrically, thermally, acoustically or optically actuated. The device 18 may be an electro-optic device. The structural system 100 may further include memory of sufficient size, type and configuration to receive and store signals, data and other information which may be transmitted or conducted by a reinforcing element 14 and/or device 18 of the structural system 100.

In yet another embodiment, functional actuation may further include deployment, folding, unfolding, stiffening, expanding, or otherwise actuating at least one or a combination of the reinforcing elements 14 and/or at least a portion of one or more structures 10 to provide a functional response. The structure 10 or system 100 may be configured to provide a generalized functional response, for example, to collect and/or reflect spatially dispersed particles such as chemicals or electromagnetic radiation. The functional response may be a localized response, such as a stiffening of a portion of the structure 10 for containment of the progression of damage incurred by the structure 10, for example, resultant from particle impingement or debris impact. Another example of a localized response may be actuation of a portion of the reinforcing element 14 to provide one of an electrical, thermal, or optical output or response, which may include providing input to or output from at least one electro-optic device, such as a device 18, spatially located on the membrane 12. The reinforcing element 14 may be configured for acoustic sensing and/or conduction, such that the strain induced on the reinforcing element 14 by an impacting particle, for example, may generate an acoustic wave transmitted by the reinforcing element 14, to a control sensor or other data collection mechanism. Measurement of particle and/or debris impact frequency and magnitude may be incorporated, for example, into a health monitoring system for the structure 10. Configuring the reinforcing element 14 to be acoustically sensing and/or electrically conductive as part of the hierarchical design of the system 100 is advantageous by enabling sensing capabilities that would otherwise require the addition of wire harnesses or ancillary electrical conductors and their associated complexity, weight and bulk. The reinforcing element 14 may be configured to be electrically conductive such that it may dissipate static build-up. The examples provided herein are for illustration and are not intended to be limiting.

As shown in FIG. 1, the thin film structure 10 may include at least one reinforcing element 14 which may formed using an additive manufacturing process, which may be referred to herein as digital manufacturing process, a print manufacturing process, or a deposition process. The thin film structure 10, including the reinforcing element 14, may be manufactured, e.g., fabricated, by depositing a reinforcing material 24 (see FIGS. 2A-2C) in a liquid form in a predefined pattern on the thin film membrane 12, and transforming the reinforcing material 24 in the predefined pattern to form the reinforcing element 14. Through the deposition and transformation process, the reinforcing element 14 becomes operatively connected to the membrane 12. As such, it would be understood that no additional bonding material, for example, an adhesive, is required to adhere the reinforcing element 14 to the membrane 12. The reinforcing material 24 may be considered to be in a liquid form whereby at least one of the materials comprising the reinforcing material 24 is in a solution, in a sufficiently softened state, and/or of a low enough viscosity such that the reinforcing material 24 exhibits liquid-like characteristics e.g., the reinforcing material 24 is in a flowable or sprayable state suitable for deposition on a substrate such as a membrane 12 using an additive technique. More than one layer of the reinforcing material 24 may be deposited in a predefined pattern to form the reinforcing element 14, and the height and/or thickness of the reinforcing element 14 may be varied by varying the amount of reinforcing material 24 and/or number of layers of reinforcing material 24 deposited to form the predefined pattern. The pattern in which the reinforcing material 24 is deposited may be defined to provide a specific combination of functional properties, which may include one or more of mechanical, electrical, thermal, acoustic and optical properties.

The membrane 12 may be comprised of a polymer which may be formable into a thin film. In a non-limiting example, the membrane 12 may be comprised of a polyimide material, such as a clear/colorless polyimide (CP) film, which may be a CP1™ or CP2™ type film. Although colorless or low color membrane may be desired for certain optical applications (e.g. transparent panels in a solar sail, inflatable lens structures, etc.), the membrane may comprise any color or opacity depending on its intended use. In another example, the membrane 12 may be comprised of a polycarbonate material or other material suitable for use in a space environment or on a space-type vehicle where resistance to ultraviolet, proton and electron radiation, high strength to volume characteristics, and compact volume stowage of large surface area deployable materials may be important.

The reinforcing material 24 deposited on the membrane 12 to form the reinforcing element 14 may be comprised of a polymer which is compatible with the material of the membrane 12, such that the reinforcing material 24 and the membrane material may operatively bond and/or adhere to each other during the deposition and transformation process, e.g., the print manufacturing process by which the structure 10 is formed. In one embodiment, the reinforcing material 24 forming the reinforcing element 14 may be comprised of a polyimide material, such as a clear/colorless polyimide (CP) material, which may be a CP1 or CP2 type. In another example, the reinforcing material 24 may be comprised of a polycarbonate material, or other material suitable for use in a space environment. The reinforcing material 24 and the membrane material may be different materials, or may include the same type of material. The latter may be preferred to enhance bonding of the reinforcing material 24 to a membrane material which is of the same material type. In one embodiment, the reinforcing material 24 forming the reinforcing elements 14 may include a polyimide material and the thin film material forming the membrane 12 may be a polyimide material.

The reinforcing material 24 may include other materials and/or elements to provide a hierarchy of performance properties and/or functional attributes. For example, the reinforcing material 24 may include a constituent material to increase the strength of the material, which may be incorporated into the liquified reinforcing material 24 prior to or during deposition of the reinforcing material 24 on the membrane 12. The constituent material may be a glass-based material, a silicon carbide material, a carbon-based material, an organic material, etc. which may be incorporated in various forms including as fibers which may be oriented, random, continuous, etc. within the reinforcing material as required to provide the desired functional properties. Other constituent materials may be incorporated to provide hierarchical capabilities. For example, constituent materials including carbon nanotubes (CNT) and/or graphene may be included to provide electrical and thermal properties to the reinforcing element 14. Other constituent materials may provide acoustic sensing capabilities such that when the reinforcing element 14 is strained by an impinging or impact load, an acoustic wave signal may be generated which can be used to detect and estimate or measure the magnitude of the impingement or the impact on the structure 10.

The thin film membrane 12 may be provided as a sheet, which may be of a discrete size defined by a shape and descriptive dimensions such as length, width, diameter, etc. In a non-limiting example, the membrane 12 may be provided, as shown in FIG. 1, as a continuous length sheet of width W, which may be cut to length as required for an application. The membrane 12 may be fabricated by drawing the membrane sheet using a solution process and/or roll-to-roll processing to create the continuous length sheet of membrane 12, where the maximum width W may be limited by the maximum width of the rolls which may be used in the forming of the membrane 12. By way of example, the width W may be approximately 2 meters to 2.5 meters. The membrane 12 may be provided in widths less than 2 meters, by forming the sheet in a narrower width, or by slitting or cutting the sheet to a narrower width, as required by the application of the structure 10 or system 100.

The reinforcing material 24 is deposited on the membrane 12 and transformed to form a reinforcing element 14. By using an additive print process to deposit the reinforcing material 24 on the membrane 12, the reinforcing material 24 may be deposited in a high fidelity manner, e.g., with high levels of accuracy and precision, in a predefined pattern on the membrane 12. The print process further enables deposition of the reinforcing material 24 in a manner that precludes or substantially eliminates or substantially eliminates wrinkling, distortion, tearing or damage of the membrane 12 during the deposition process, and as described previously, obviates the need for an adhesive or secondary bonding agent to attach the reinforcing material 24 to the membrane 12.

The pattern in which the reinforcing material 24 is deposited, e.g., printed on the membrane 12 may be varied to suit the particular application of the structure 10, or the performance requirements of the system 100. For example, as shown in FIG. 1, the reinforcing material 24 may be deposited to form reinforcing elements 14A which are generally configured as vertical lines (as viewed on the page), where the term vertical, as used herein, may refer to generally running lengthwise of the continuous sheet, which may provide additional strength to the structure 10 in the lengthwise direction, and increase resistance to and/or contain damage propagation across the width W of the sheet.

In another embodiment shown in FIG. 1, the reinforcing material 24 may be deposited to form a reinforcing element 14B which is generally configured as a horizontal line (as viewed on the page), where the term horizontal, as used herein, may refer to generally running widthwise of the continuous sheet, which may provide additional strength to the structure 10 in the widthwise direction, and increase resistance to and/or contain damage propagation along the length of the sheet. Two or more reinforcing elements 14 may form a predefined pattern by intersecting each other, as shown by the intersection of elements 14A with elements 14B and 14C of FIG. 1. The resulting pattern comprising a combination of reinforcing elements 14 may be symmetrical, asymmetrical, geometric, random, or specific to an application of the structure 10 or system 100, as will be described in further detail herein.

Figure 3:
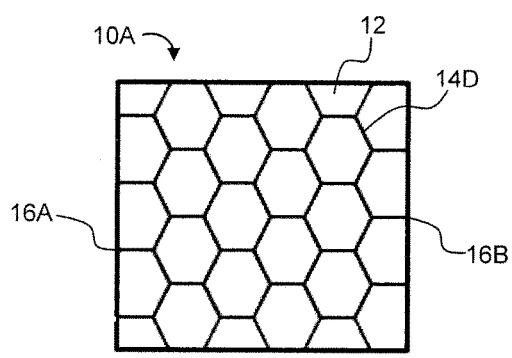
FIG. 3 is a schematic plan view of a thin film structure with the reinforcing material in a first illustrative example of a reinforcing pattern.
Figure 4:
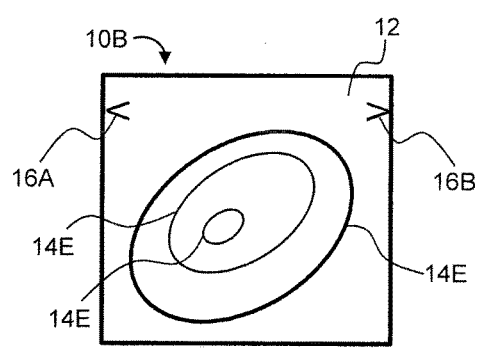
FIG. 4 is a schematic plan view of a thin film structure with the reinforcing material in a second illustrative example of a reinforcing pattern.
Figure 7:
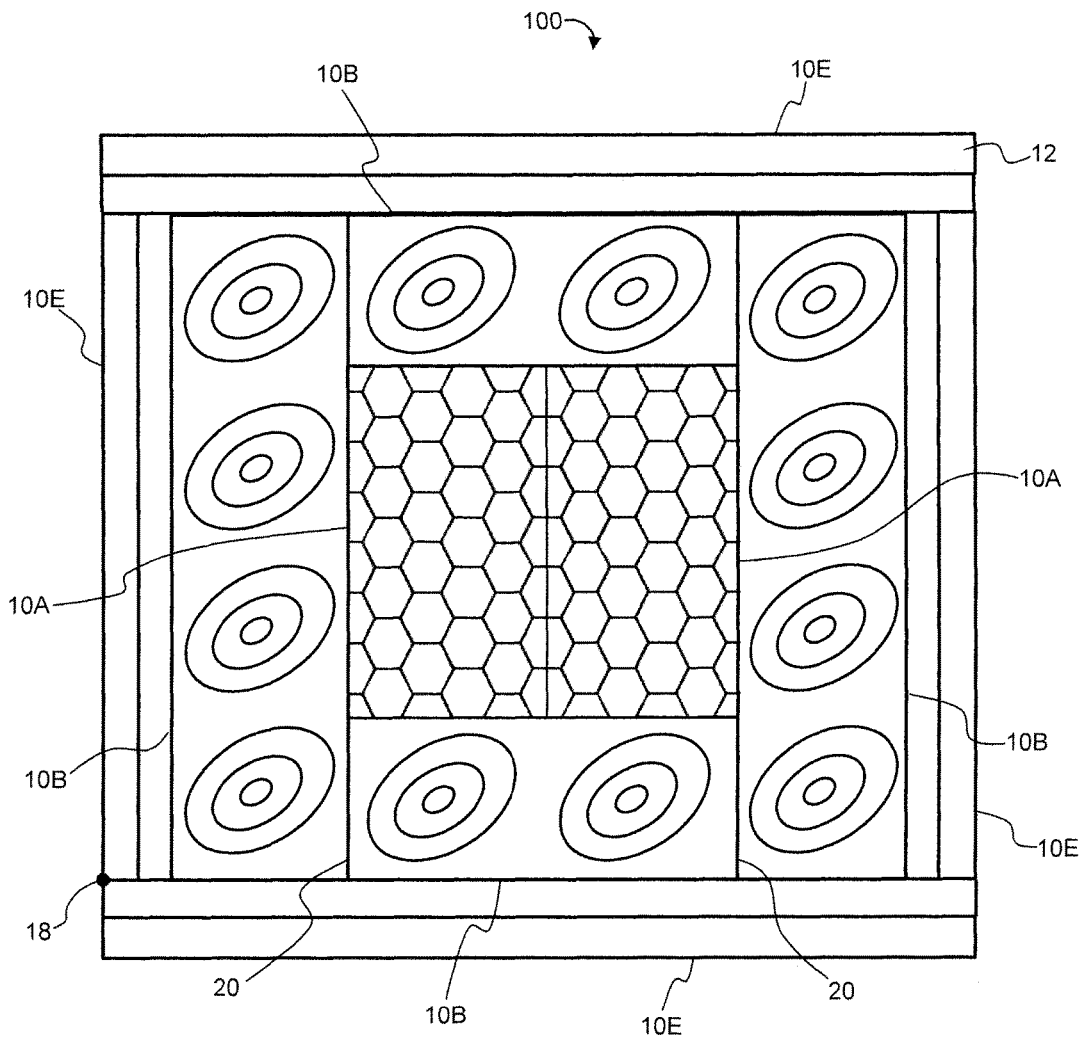
FIG. 7 is a schematic plan view of a thin film structural system including a plurality of thin film structures.

The term "reinforcing element 14" when used generally herein may refer to, but is not limited to, one or more of a portion of a singular or discrete reinforcing element such as elements 14A, 14B and 14C of FIG. 1, a pattern formed by a combination of elements such as the combination of elements 14A, 14B and 14C of FIG. 1, a symmetrical element pattern such as the hexagonal pattern 14D shown in FIG. 3, a plurality or grouping of elements such as the elements 14E shown in FIG. 4, a combination of a patterned element and a discrete element such as the respective combination of the elements 14F and 14A shown in FIG. 5, a combination of different predefined patterns of elements such as the combination of elements 14D and 14E of FIG. 6 to form a structure 10D, a combination of elements provided by joining a first structure 10 to at least another structure 10 such as the combination of structures 10A, 10B and 10E shown in FIG. 7, and/or other combinations of reinforcing elements as may be described herein.

The predefined pattern may be configured as any printable pattern, which may include any combination of linear, non-linear, discrete and/or continuous shapes, and may be of varying dimensions from one element 14 to another element 14 within a pattern or within an element 14 of the pattern itself. For example, the reinforcing element 14A may be a line which is thicker (wider) than the line forming the reinforcing element 14B. The reinforcing element 14 may be non-linear, skewed to the length and/or width of the membrane 12, and/or discontinuous, comprised of a plurality of discrete segments of varying dimension and shape as shown by example as the element 14C in FIG. 1.

In one example method, the reinforcing material 24 may be deposited in a melted form in a predefined pattern, and solidified by cooling to form the reinforcing element 14. The reinforcing material 24 may be considered to be in a melted form whereby at least one of the materials comprising the reinforcing material 24 is in a sufficiently softened state to allow deposition of the reinforcing material 24 in a liquid-like form. This may be accomplished, for example, by elevating the temperature of the reinforcing material 24 above one of a melting temperature or glass transition temperature of a constituent material forming the reinforcing material 24 such that the reinforcing material 24 is in a sufficiently softened state, and/or of a low enough viscosity to exhibit liquid-like characteristics e.g., the reinforcing material 24 is in a flowable state suitable for deposition using an additive technique. In one embodiment, the additive process used to deposit and solidify the melted, liquefied reinforcing material 24 may be similar or analogous to one of a fused deposition modeling (FDM) process or a selective laser sintering (SLS) process.

In another example method, the reinforcing material 24 may be deposited in a liquid form and transformed by a light induced chemical reaction. The light source may be, for example, an ultraviolet light source or a laser. The chemical reaction may cause the solidification of the reinforcing material, for example, by polymerization and/or the use of chemical initiators. By way of non-limiting examples, the additive process used to deposit and chemically react the liquid reinforcing material 24 may be similar or analogous to an inkjet printing process, which may also be referred to as a digital manufacturing process.

The reinforcing material 24 may be deposited onto a membrane 12 of any size and/or shape suitable to forming the thin film structure 10. The membrane 12 may be formed and/or shaped to a predetermined or discrete size and shape.

The membrane 12 may be a portion of a continuous sheet of thin film material. In the instance where the thin film structure 10 may be fabricated using a continuous sheet of membrane 12, a roll-to-roll method may be used to efficiently deposit the reinforcing material 24 on the membrane 12 in one or more predefined patterns and to subsequently transform the deposited material into the reinforcing element 14. The process to deposit the reinforcing material 24 on the membrane 12 may be automated to facilitate precise formation of complex patterns when depositing the reinforcing material 24. The process may be configured such that during roll-to-roll processing of the membrane 12, the reinforcing material 24 is deposited in a first pattern or a number of repetitions of the first pattern for a first length of membrane 12, in a second pattern or a number of repetitions of the second pattern for a second length of membrane 12, and so forth combining patterns and pattern sequences during the deposition of the reinforcing material 24 as required to produce the desired configurations and quantities of structures 10 using the continuous length membrane 12, such that set-up and changeover time is minimized and limited to a modification of the pattern executed or the type of reinforcing material 24 being deposited, for example, by a programmer controlling the equipment feeding and depositing the reinforcing material 24. A membrane 12 thus formed may be subsequently cut to separate the first length from the second length, and so on, or to separate a number of repetitions of one pattern from a number of repetitions of the same pattern, or otherwise as required to form the structure 10 or system 100.

Figure 2A:
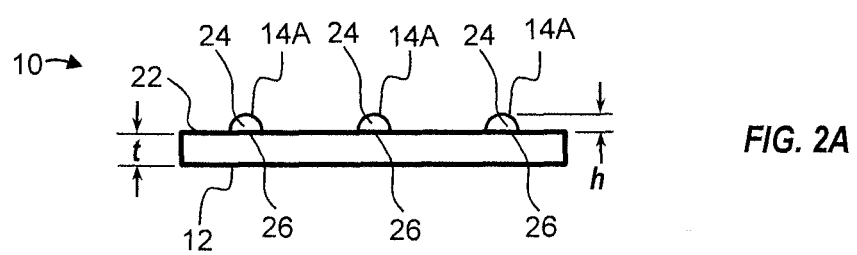
FIG. 2A is a schematic cross-sectional view of section A-A of the thin film structure of FIG. 1 illustrating the reinforcing material on the surface of the thin film membrane in a first example.
Figure 2B:
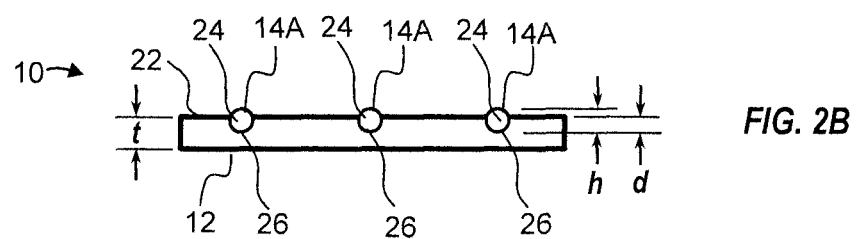
FIG. 2B is a schematic cross-sectional view of section A-A of the thin film structure of FIG. 1 illustrating the reinforcing material partially embedded in the thin film membrane in a second example.
Figure 2C:
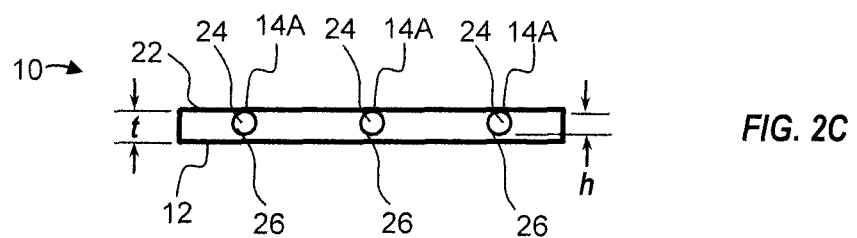
FIG. 2C is a schematic cross-sectional view of section A-A of the thin film structure of FIG. 1 illustrating the reinforcing material substantially embedded in the thin film membrane in a third example.

As shown in a first example in FIG. 2A, the reinforcing material 24 may be deposited on the substrate or membrane 12 such that the reinforcing element 14 is formed on and is operatively connected with the surface 22 of the membrane 12. FIG. 2A shows a schematic cross-sectional view of section A-A of the thin film structure of FIG. 1. It would be understood that the cross-sectional shape of the reinforcing elements shown in FIG. 2A, and in FIGS. 2B and 2C, are for illustrative purposes only and are not intended to be limiting. The shape and/or size of the reinforcing elements may be defined by the pattern by which the reinforcing material 24 is deposited onto the membrane 12, and may, as described previously, be of different shapes or sizes from one to another reinforcing element 14, or of different shapes or sizes within a single reinforcing element 14. In one embodiment, the cross-sectional area of each of the reinforcing elements 14A is shown in FIG. 2A as having a generally half-circular shape, and as protruding beyond the surface 22 of the membrane 12 at a height h. The membrane 12 may be defined by a thickness t, also shown in FIG. 2A. The reinforcing element 14A as shown in FIG. 2A does not substantially penetrate the thickness/t of the membrane 12, rather it contacts the surface 22 of the membrane 12 such that the reinforcing element 14 is operatively connected to the membrane 12 at the interface 26 defined by the interfacing surfaces of the reinforcing element 14A and the membrane 12.

In another example a schematic cross-sectional view of section A-A of the thin film structure of FIG. 1 is shown in FIG. 2B, the reinforcing material 24 may be deposited and transformed on the membrane 12 such that the reinforcing element 14A is at least partially embedded in the thin film membrane 12. By embedding the reinforcing element 14 at least partially in the membrane 12, the strength of the attachment of the reinforcing element 14 to the membrane 12 may be increased by increasing the size of the interface area 26 between the reinforcing element 14 and the membrane 12. Further, by at least partially embedding the reinforcing element 14 in the thickness t of the membrane 12, the ability of the structure 10 to sustain loading, withstand damage, and/or contain the progression of damage, for example a tear, crack or hole in the membrane, is increased. The reinforcing material 24 may be deposited on a surface 22 of the membrane 12 when the membrane 12 is in a wet condition, for example, when the membrane 12 contains solvent residual from a solution process forming the membrane 12. The deposited reinforcing material 24 interacts with the wet condition of the surface 22 of the membrane 12 such that the reinforcing material 24 at least partially penetrates the thickness t of the membrane to a depth d, as shown in FIG. 2B. The reinforcing material 24 is transformed to form the reinforcing element 14A, which becomes at least partially embedded in and operatively connected to the membrane 12 at the interface 26 defined by the interfacing surfaces of the reinforcing element 14A and the membrane 12. The extent to which the reinforcing element 14A is embedded in the membrane 12 may be expressed as a percentage of the reinforcing element 14A which has penetrated the surface 22 of the membrane 22, e.g., relative to the total cross-section of the reinforcing element 14A, or relative to a descriptive dimension of the cross-section of the reinforcing element 14A. In the present case, by way of non-limiting example, the ratio of the depth d of penetration of the reinforcing element 14A, relative to a diameter representing the height h of the cross-section of element 14A, d/h, may be used to calculate a percent embedded value for the reinforcing element 14A. Alternatively, the extent to which the reinforcing element 14A has penetrated or become embedded in the thickness t of the membrane 12 may be expressed as a ratio of the depth of penetration of the embedded element 14 to the total thickness t of the membrane 12, d/t.

In another example shown in FIG. 2C, the reinforcing material 24 may be deposited such that the reinforcing element 14A is fully embedded or substantially fully embedded in the thickness t of the membrane 12, such that the reinforcing element 14A is substantially enveloped by the membrane 12, e.g., the ratio d/h approaches or is approximately equal to one, the interface 26 is substantially defined by the exterior surface of the reinforcing element 14, and the ratio d/t approaches its maximum value and may be approximated by h/t. By embedding the reinforcing element 14 completely or nearly completely in the membrane 12, the strength of the attachment of the reinforcing element 14 to the membrane 12 may be increased by increasing the size of the interface area 26 between the reinforcing element 14 and the membrane 12. Further, by embedding substantially the entire reinforcing element 14 in the thickness t of the membrane 12, the ability of the structure 10 to sustain loading, withstand damage, and/or contain the progression of damage, for example a tear, crack or hole in the membrane 12, may be significantly increased.

As described previously, the reinforcing material 24 may be deposited in any variety of patterns. In one example, one of a plurality of possible patterns may be the pattern shown in FIG. 1, which may comprise continuous elements 14A formed along the entire length of membrane 12 configured to include that pattern. The elements 14B and 14C may be repeated at various intervals along the length of the membrane 12 to provide the predetermined pattern. As described previously, the pattern may be repeated a plurality of times over a continuous length of sheet of membrane 12 in a roll-to-roll process. Subsequent to forming, the continuous length may be separated into a plurality of lengths of membrane 12, each including at least a portion of the repeating pattern, or one or more repeats of the repeating pattern, where each of the plurality of lengths may comprise a thin membrane structure 10. One or more of the structures 10 may be incorporated into a system 100, as described previously.

Two or more of the structures 10 may be joined together to form a larger structure 10 or system 100, as may be desired when the required structure width exceeds the width W of the membrane sheet 12, as shown for the joined elements 10A in FIG. 7. Two or more structures 10 may be joined by joining a portion of one structure 10 to another, where the structures being joined are shaped and/or arranged as required for formation of the larger structure 10 or the system 100 into which the larger structure 10 is to be incorporated, as shown in FIG. 7. In a non-limiting example, a first structure 10 may be joined to a second structure 10 by operatively attaching the lengthwise edge of the membrane 12 of the first structure 10 to the lengthwise edge of the membrane 12 of the second structure 10. The edges of the first and second structures 10 may be randomly matched, as may be allowable or suitable for a continuous lengthwise or substantially randomized pattern or one where the pattern does not extend to the portions of the respective structures 10 being joined.

Alternatively, as desired or required by the application of the larger structure or system 100, the respective portions of the structures 10 may be aligned such that the pattern of the first structure is positioned in a predetermined alignment with the pattern of the second structure. For example, referring to FIG. 1, a first structure 10 including the pattern shown in FIG. 1 may be aligned for joining with a second structure 10 including the pattern shown in FIG. 1, such that the end 16A of the reinforcing element 14B of the first structure 10 is aligned with the end 16B of the reinforcing element 14B of the second structure 10. By joining the aligned edges of the two structures 10 to form the larger structure 10 or a system 100, the reinforcing elements 14B of the first and second structures 10 will be joined to form a reinforcing element 14B which is continuous across the width of the larger structure 10. This may be desirable, for example, where continuous reinforcing elements 14 must be provided across the entire length and width of the larger structure 10 to provide reinforcement, or as described previously, for other purposes including sensing and/or electrical conductivity across the width of the structure 10, deployment facilitation as a folding or hinge line, etc.

FIGS. 3 through 6 show other possible patterns which may be used in fabricating a thin membrane structure 10. These examples are illustrative and are not intended to be limiting. It would be understood that by using an additive print process to deposit the reinforcing material 24 on the membrane 12, the reinforcing material 24 may be deposited in a high fidelity manner, e.g., with high levels of accuracy and precision, in an unlimited number of patterns and/or combination of patterns.

FIG. 3 shows a thin film structure 10A including a symmetrical and continuously repeating hexagonal pattern of reinforcing elements 14D. The structure 10A may be used, for example, in an application where damage containment is a requirement. The hexagonal pattern of reinforcing elements 14D may be effective in limiting the propagation and/or progression of damage, such as a tear or rupture in the membrane 12, across the length and/or wide of the structure 10A. The hexagonal pattern may also be used as a sensing or conductive grid, for example, by composing the reinforcing elements 14 of a reinforcing material which is at least one of electrically, thermally, optically or acoustically conductive, and/or of a reinforcing material 24 which may be actuated by an input to output a signal. The actuation source may be a thermal, electrical, optical or acoustic input, or may be a mechanical input, such as an impact or impingement force to the reinforcing element 14D which causes a responsive output from the reinforcing element 14 to a sensor, memory or controller in operative communication with the structure 10A and/or reinforcing element 14D. As described previously, two or more of the structures 10A may be joined to form a larger structure 10 or system 100. Alignment indicators, which may also be referred to as indexing indicators 16A and 16B may be matched or aligned during the joining process to align the two or more structures 10A and to maintain continuity of the hexagonal pattern and/or reinforcing and/or conductive paths defined thereby across the width of the larger structure 10.

In another embodiment shown in FIG. 4, the thin film structure 10B includes a predetermined pattern comprised of a plurality or grouping of elements such as elements 14E. The elements 14E may be discrete, e.g., discontinuous in that each of the elements 14E may not be operatively connected to another of the elements, such that each element 14E may be independently responsive to an input. Alternatively, as shown in FIG. 6, a reinforcing element 14E may be operatively connected to another reinforcing element 14E by a connective reinforcing element 14G, as desired to provide a reinforcing and/or conductive path between the elements 14E. As described previously, two or more of the structures 10B including the pattern or repetitions of the pattern including reinforcing elements 14E may be joined to form a larger structure 10 or system 100. The two or more structures 10B may be joined in a randomized manner or the orientation of one structure 10B to another structure 10B may be determined by alignment of the indexing indicators 16A, 16B or otherwise as specified by the requirements of the system 100 including the structure 10.

FIG. 5 shows another example of a thin film structure 10C including a reinforcing element 14F in operative communication with a reinforcing element 14A. The reinforcing element 14A may be provided along the continuous length of the structure 10C, such that it may provide a communication, connecting and/or conductive path between a plurality of reinforcing elements 14F arranged in a repeating pattern at intervals along the length of the structure 10C. The reinforcing element 14F may include a folding line or major stem 20 and a plurality of substructural reinforcing elements arranged in a pattern similar to the stem and substructural elements of an insect wing. Similar to an insect wing, the reinforcing element 14F including at least one fold line 20 may exhibit a high degree of mechanical flexibility and compliance that enables multiple folding and unfolding cycles which at the same time providing stiffness and damage tolerance. The fold line 20 may be configured as a folding line or a hinge, to enable a folding function of the structure 10C, and/or to enable folding and unfolding of the structure 10C for packaging and/or deployment. The pattern of the reinforcing element 14F may prevent progressive failure by redistributing loads around a damaged area of the membrane 12. This combination of properties may be beneficial in the configuration of an expandable space structure such as a solar sail or sunshield, where multiple folding and unfolding cycles may be required. A pattern similar to the reinforcing element 14F may be produced at a larger scale, e.g., in a larger size or wider than a width W, by subdividing the pattern of the element 14F into a plurality of sections, each section representing one section of the entire pattern defining the element 14F, print manufacturing each section on a membrane 12 to form a section of the reinforcing element 14F, then subsequently arranging and joining the sections to provide a larger scale structure 10C, which may be incorporated into a system 100 such as a solar sail or sunshield.

The structure 10C may include one or more devices 18. As described previously, the device 18 may be configured as a sensor or actuator in operative communication with the reinforcing element 14F and/or the reinforcing element 14A, and may be configured to receive inputs from and/or provide outputs to at least one of the elements 14A, 14F. At least one of the elements 14A, 14F may be configured as a sensing or conductive element, as described previously. In a non-limiting example, the reinforcing element 14F may be configured such that the folding or hinge line 20 may be actuated to fold and/or unfold in response to a signal received from the device 18, which may be actuated by a signal from a controller received by the device 18 and/or the element 14F through the element 14A, where the element 14A is configured as a conductive element.

FIG. 6 shows another non-limiting example of a thin film structure 10D. The structure 10D may be fabricated by depositing the reinforcing material 24 in a pattern which represents a combination of other patterns arranged in a structure 10D as required for a specific application or configuration of a system 100. The thin film structure 10D may fabricated by depositing a first reinforcing material 24 in a pattern forming a plurality of reinforcing elements 14E operatively connected by a connective reinforcing element 14G, and depositing a second reinforcing material 24 in a pattern forming a plurality of reinforcing elements 14D. The first reinforcing material 24 and the second reinforcing material 24 may differ in composition, properties, method of deposition, and/or method of transformation, or may be the same. In a non-limiting example, the first reinforcing material 24 forming the reinforcing elements 14E, 14G may be configured to be conductive, such that the reinforcing elements 14E, 14G may be configured as a sensor, an actuator, etc., and/or to emit and receive signals with a plurality of devices 18A, 18B in communication with the reinforcing elements 14E, 14G. The second reinforcing material 24 forming the reinforcing elements 14D may be non-conductive, however may include a constituent material, for example, a glass fiber, to provide increased reinforcing strength and a supportive matrix for the reinforcing elements 14E, 14G. The hierarchical combination and varying properties and capabilities of the membrane 12, reinforcing elements 14D, 14E, 14G and devices 18A, 18B may provide a structure 10 configured to efficiently and compactly provide multiple functions and performance characteristics.

FIG. 7 shows a non-limiting example of a structural system 100 which may be formed by combining two or more structures 10 where at least two of the structures 10 may, but are not required to, contain a different pattern or repetitions of pattern. In the example shown in FIG. 7, a plurality of structures 10A may be joined to form a first larger structure 10A having a symmetrical and relative denser pattern of generally hexagonal reinforcing elements 14D (see FIG. 3) which may form the central portion of the system 100. As described for FIG. 6, the reinforcing elements 14D may be formed from a reinforcing material 24 which includes a reinforcing or strengthening constituent. This may be beneficial should it be anticipated or known that the central portion of the system 100 may be subjected to more frequent and/or higher loads, debris impingement, etc. than the perimeter portions of the system 100.

A second plurality of structures 10B may be arranged and joined to the structures 10A to provide another hierarchical level of function. For example, the reinforcing elements 14E (see FIG. 4) may be configured as discrete and independent elements to provide reinforcement and strength to the border formed by the plurality of structures 10B, while retaining sufficient flexibility to allow expansion and contraction of the border thus formed in response to changes in thermal, environment, or loading conditions, thus providing a reinforced zone for stress dissipation across the expanse of the system 100. Optionally, either or both of the pluralities of structures 10A, 10B may be configured to include reinforcing elements which are conductive and/or sensing, and/or one or more devices 18 as described herein.

A third plurality of structures 10E may be arranged and joined to the plurality of structures 10B, to form an outermost border of the system 100 shown in FIG. 7. The structures 10E may include a plurality of reinforcing elements 10A (see FIG. 1) which may be continuous along the length of the structures 10E. In the example shown, the reinforcing elements 10A included in the structures 10E may include a stiffening and/or strengthening constituent, such as a glass or organic fiber, to increase the edge strength of the system 100, and may further include a conductive constituent, such that the reinforcing elements 10A are at least one of electrically, optically, acoustically and thermally conductive. Accordingly, the reinforcing elements 10A may be configured as conductors, sensors, actuators, etc., for example, to dissipate static build-up, to perform health monitoring of the system 100, to measure operating conditions and environment, to operatively communicate with other elements of the system 100, which may include a device 18 and/or one or more folding or hinge lines 20.

While the best modes for carrying out the invention have been described in detail with respect to aerospace applications, those familiar with the art to which this invention relates will recognize the broader applicability of the invention and the various alternative designs and embodiments for practicing the invention within the scope of the appended claims.

The invention claimed is:

1. A method for manufacturing a thin film structural system including a thin film structure, the method comprising:
   depositing a liquid reinforcing material in a flowable state in a predefined pattern onto a thin film membrane, wherein the thin film membrane has a thickness, and wherein the liquid reinforcing material is deposited such that it at least partially penetrates the thickness of the membrane; and
   transforming the liquid reinforcing material after it is deposited in the predefined pattern onto a thin film to form a non-conductive reinforcing element such that the reinforcing element is at least partially embedded within the thin film membrane;
   wherein the thin film membrane and the reinforcing element form a thin film structure; and
   wherein the liquid reinforcing material and the thin film membrane are transparent and both comprise a clear and colorless polymer material, and wherein the clear and colorless polymer material is the same in the liquid reinforcing material and the thin film membrane.

2. The method of claim 1, wherein the reinforcing material is deposited in a melted form and solidified by cooling.

3. The method of claim 1, wherein the reinforcing material is transformed by a light induced chemical reaction.

4. The method of claim 1, wherein the reinforcing material is substantially fully embedded within the thin film membrane.

5. The method of claim 1, wherein the liquid reinforcing material includes one or more constituent materials that increase the strength of the material, and wherein the predefined pattern is configured such that the reinforcing element resultant therefrom is configured to redistribute loads around a damaged portion of the membrane.

6. The method of claim 1, wherein the reinforcing material is deposited in a predefined pattern configured to define at least one of a hinge, a hinge line, and a folding line.

7. The method of claim 1, wherein the reinforcing material is deposited in a predefined pattern configured to define at least one stiffening feature.

8. The method of claim 1, further including:
   forming a plurality of thin film structures, each of the respective thin film structures including a respective thin film membrane and a respective reinforcing element; and
   joining at least two of the plurality of thin film structures.

9. The method of claim 8, wherein the predefined pattern of the respective reinforcing element of at least one of the plurality of thin film structures is different from the predefined pattern of the respective reinforcing element of at least another of the plurality of thin film structures.

10. A method for manufacturing a structure including a thin film structural system, the method comprising:
    depositing a reinforcing material in one of a melted and liquid form in a predefined pattern onto a thin film membrane, wherein the thin film membrane has a thickness, and wherein the reinforcing material is deposited such that it at least partially penetrates the thickness of the membrane;
    transforming the reinforcing material in the predefined pattern by one of a cooling process and a light induced chemical reaction to form a non-conductive reinforcing element that is at least partially embedded within the thin film membrane;
    wherein the thin film membrane and the reinforcing element form a thin film structure;
    wherein the predefined pattern is configured such that the reinforcing element resultant therefrom is configured to redistribute loads around a damaged portion of the thin film structure; and
    wherein the liquid reinforcing material and the thin film membrane are transparent and both comprise a clear and colorless polymer material, and wherein the clear and colorless polymer material is the same in the liquid reinforcing material and the thin film membrane.

11. The method of claim 10, wherein:
    forming a plurality of thin film structures, each of the respective thin film structures including a respective thin film membrane and a respective reinforcing element; and
    operatively joining at least two of the plurality of thin film structures;
    wherein the predefined pattern of the respective reinforcing element of at least one of the plurality of thin film structures is different from the predefined pattern of the respective reinforcing element of at least another of the plurality of thin film structures.

12. The method of claim 11, wherein:
    the structure is configured as an expandable structure; and
    the predefined pattern of the reinforcing element forms one of a local stiffening feature, a folding line, and a hinge line to facilitate one of packaging and deployment of the expandable structure.

13. The method of claim 1, wherein the reinforcing material is fully embedded within the thin film membrane.

* * * * *